(12) United States Patent
Charmley

(10) Patent No.: US 12,024,907 B2
(45) Date of Patent: Jul. 2, 2024

(54) ARTICULATED STRUCTURAL THREE-DIMENSIONAL PRINTING MACHINE

(71) Applicant: ARC Ventures LLC, St. Louis, MO (US)

(72) Inventor: James E. Charmley, St. Louis, MO (US)

(73) Assignee: ARC Ventures LLC, St. Louis, MO (US)

( * ) Notice: Subject to any disclaimer, the term of this patent is extended or adjusted under 35 U.S.C. 154(b) by 64 days.

(21) Appl. No.: 17/945,647

(22) Filed: Sep. 15, 2022

(65) Prior Publication Data
US 2023/0078334 A1 Mar. 16, 2023

Related U.S. Application Data

(60) Provisional application No. 63/244,511, filed on Sep. 15, 2021.

(51) Int. Cl.
*E04G 21/04* (2006.01)
*B33Y 10/00* (2015.01)
(Continued)

(52) U.S. Cl.
CPC ..... *E04G 21/0463* (2013.01); *E04G 21/0436* (2013.01); *B33Y 10/00* (2014.12);
(Continued)

(58) Field of Classification Search
CPC . E04G 21/0463; E04G 21/0436; B33Y 10/00; B33Y 30/00; B33Y 50/02; Y10T 137/8807
See application file for complete search history.

(56) References Cited

U.S. PATENT DOCUMENTS 3,938,670 A * 2/1976 Wellman ................. B66C 23/34
212/297
5,597,078 A * 1/1997 Becker .................... B66C 23/42
212/231
(Continued)

FOREIGN PATENT DOCUMENTS

WO 2019243440 A1 12/2019

OTHER PUBLICATIONS

World Intellectual Property Office, International Search Report and Written Opinion for International Application No. PCT/US2022/043662, Mailed Jan. 6, 2023, 9 pages.

*Primary Examiner* — Daphne M Barry
*Assistant Examiner* — Frederick D Soski
(74) *Attorney, Agent, or Firm* — Lewis Rice LLC

(57) ABSTRACT

Systems, methods, and devices for structural 3D printing. A machine frame with multiple articulated arm segments pivoting within planes substantially parallel to the plane of material deposition are controlled by a controller to move a printhead attached to a material line to convey a construction material to a deposit position for dispensation. The controller is configured to receive 3D printing information and convert it to positional coordinates of the printhead, and to cause movement of the articulated arm segments and support members to position the printhead, while using sensor feedback. Vertical movement of the printhead is facilitated through one or more mechanisms such as elevating the machine platform, elevating the articulating arm segments, and/or the incorporation of a mast on one or more of the arm segments.

14 Claims, 5 Drawing Sheets

(51) Int. Cl.
*B33Y 30/00* (2015.01)
*B33Y 50/02* (2015.01)

(52) U.S. Cl.
CPC ............. *B33Y 30/00* (2014.12); *B33Y 50/02* (2014.12); *Y10T 137/8807* (2015.04)

(56) References Cited

U.S. PATENT DOCUMENTS

| | | | | |
|---|---|---|---|---|
| 6,065,621 | A * | 5/2000 | Fatemi | B66C 23/48 |
| | | | | 212/301 |
| 6,220,292 | B1 * | 4/2001 | Woodling | B66C 23/42 |
| | | | | 137/355.16 |
| 8,800,482 | B2 * | 8/2014 | Schwenke | H05B 3/86 |
| | | | | 118/712 |
| 9,150,390 | B2 * | 10/2015 | Willim | B66C 23/62 |
| 11,198,284 | B2 * | 12/2021 | Gibson | B33Y 50/02 |
| 11,440,217 | B2 * | 9/2022 | Wang | B33Y 10/00 |
| 11,746,927 | B2 * | 9/2023 | Sergison | B28B 1/001 |
| | | | | 137/615 |
| 2007/0062383 | A1 * | 3/2007 | Gazeau | B33Y 30/00 |
| | | | | 101/35 |
| 2013/0297046 | A1 * | 11/2013 | Hendron | E02F 9/265 |
| | | | | 700/56 |
| 2014/0048969 | A1 * | 2/2014 | Swanson | B29C 64/209 |
| | | | | 264/129 |
| 2014/0074274 | A1 * | 3/2014 | Douglas | B29C 64/118 |
| | | | | 700/105 |
| 2014/0374935 | A1 * | 12/2014 | Flitsch | B33Y 50/02 |
| | | | | 425/62 |
| 2016/0176115 | A1 * | 6/2016 | Becker | B25J 9/1679 |
| | | | | 425/150 |
| 2016/0199142 | A1 | 7/2016 | Griffiths et al. | |
| 2017/0021527 | A1 | 1/2017 | Grivetti et al. | |
| 2017/0066186 | A1 * | 3/2017 | Gardiner | E04F 13/0875 |
| 2017/0217013 | A1 | 8/2017 | Iqtidar et al. | |
| 2018/0056544 | A1 * | 3/2018 | Kreiger | B29C 64/236 |
| 2018/0361729 | A1 | 12/2018 | Gibson et al. | |
| 2019/0168448 | A1 * | 6/2019 | Osiroff | B29C 64/236 |
| 2019/0240912 | A1 * | 8/2019 | Alves | B33Y 30/00 |
| 2019/0368218 | A1 * | 12/2019 | Shaske | B66C 23/701 |
| 2020/0024842 | A1 * | 1/2020 | Criado | B33Y 10/00 |
| 2021/0107177 | A1 * | 4/2021 | Giles | E04B 1/35 |
| 2022/0136619 | A1 * | 5/2022 | Sergison | F16L 3/015 |
| | | | | 137/615 |
| 2022/0297990 | A1 * | 9/2022 | Fox | B62B 3/0612 |
| 2023/0078334 | A1 * | 3/2023 | Charmley | E04G 21/0436 |
| | | | | 425/63 |
| 2023/0339609 | A1 * | 10/2023 | Cornejo | B64C 39/024 |
| 2023/0366222 | A1 * | 11/2023 | Pettit | E04G 21/0427 |

* cited by examiner atts">;
ARTICULATED STRUCTURAL THREE-DIMENSIONAL PRINTING MACHINE

CROSS-REFERENCE TO RELATED APPLICATIONS

This application claims the benefit of U.S. Prov. Pat. App. Ser. No. 63/244,511, filed Sep. 15, 2021, the entire disclosure of which is incorporated herein by reference.

BACKGROUND OF THE INVENTION

Field of the Invention

This disclosure relates generally to structural three dimensional printing and, more particularly, to a structural three dimensional printing machine with arm segments moving by rotation in planes substantially parallel to the plane of material deposition.

Description of the Related Art

Three-dimensional (3-D) printing (also known as additive manufacturing or rapid prototyping) allows for the production of three-dimensional objects by building up a material on a layer-by-layer basis. One common 3-D printer employs a printhead extruding material while moving independently in three Cartesian axes (X, Y, Z) with respect to a print surface. Under the control of a computer, the printhead moves through a series of positions over the printing surface and at each location deposits a small volume of material to define a portion of the printed object at that location. After a base layer is printed directly on the printing surface in the horizontal, XOY plane, the printhead is successively elevated (Z-axis) to print additional layers on top of and parallel to the base layer plane and then each succeeding layer until the entire object is printed. Motion in each dimension is achieved through translation along each principal axis, often using a motor and a reference rail or linear guide to achieve precise positioning. In structural or construction 3-D printing, a large gantry crane must be assembled on site to create or serve as these rails or guides which can take many hours or days to set up accurately. Furthermore, because a construction site is typically dusty and experiences precipitation, keeping the horizontal rails and guides free of debris and contamination is a cumbersome task throughout the construction process which can limit the effectiveness of the machine.

Other 3-D printers utilize rotation about one or more axes, rather than translation along all axes, to position the printhead for extrusion. As an example, U.S. Pat. No. 8,644,964 describes an excavator that includes an upper frame pivotally mounted to an undercarriage. The excavator also includes a large boom that extends from an upper frame adjacent to a cab. The boom is rotatable about a vertical arc by actuation of a pair of boom cylinders. A printer head is rotatably mounted at one end of the boom. This method requires vertical arc motion of both booms which are heavy and therefore difficult to move accurately enough for most structural 3-D applications.

As another example, U.S. Pat. Nos. 10,857,694 and 9,777,491 describe a machine that includes a pivoting boom that relies upon a horizontal linear slide mechanism to position the printhead in the XOY plane during deposition. Fabrication of precision linear slides and the drive mechanism associated with the slides may be costly or difficult, particularly for large systems. Further the fabrication process is normally slow, limited by a speed at which a single carriage holding one or more printheads may be maneuvered within a framework of the ways. Also, keeping any linear slide mechanism free of dirt and debris is challenging on a construction site, especially when that linear slide is primarily in a horizontal plane and readily collects construction dust and precipitation. If the horizontal translation mechanism is not kept clean, the structural printer's effectiveness will be limited.

Prior art construction 3-D printers have relied in whole or in part on horizontal translation and/or vertical rotation to move the printhead through the plane of material deposition (XOY). Limiting motion of the printhead to rotations within planes parallel to the plane of material deposition (XOY) during each print layer enables more energy efficient motion as well as highly accurate material placement both within each layer and from one layer to the next layer. Further, sealing each rotational axis to keep it free from debris and precipitation on a construction site is a well-established and a relatively low cost design approach which eliminates problems of dust and/or water contamination inherent in previous designs that rely on horizontal translation and/or sliding along reference rails or guides to enable motion during deposition of each print layer.

SUMMARY OF THE INVENTION

The following is a summary of the invention in order to provide a basic understanding of some aspects of the invention. This summary is not intended to identify key or critical elements of the invention or to delineate the scope of the invention. The sole purpose of this section is to present some concepts of the invention in a simplified form as a prelude to the more detailed description that is presented later.

Because of these and other problems in the art, described herein, among other things, is a printing system including a machine frame having a plurality of ground engaging elements to facilitate movement of the machine frame, wherein the plurality of ground engaging elements includes one or more of a wheel and/or one or more of a track; a plurality of stabilizers coupled to the machine frame and moveable from a retracted position to an extended position to engage the ground; two or more articulating arm segments coupled to counterweights wherein the proximal arm segment is rotationally coupled to the machine frame and configured to pivot about a rotational axis that is off-center in at least one dimension from the machine frame and wherein all articulating arm segments are configured to pivot within planes parallel to the plane of material deposition; a material line coupled to at least one of the articulating arm segments and configured to convey a material therethrough; a printhead coupled to one or more arm segments and in fluid communication with the material line to receive the construction material and to dispense the construction material; a mast coupled to the second or later arm segment and configured to move at least perpendicular (in the z-direction) to the rotational plane of the arm segments thereby raising or lowering the printhead between print layers; a fastener dispensing implement coupled to one or more articulating arm segments and configured to dispose one or more fasteners or a contiguous fastening material on top of or at least partially through the deposited material; a controller configured to convert the 3D printing information into (X, Y) positional coordinates within the plane of deposition and affect the position of the printhead by adjusting one or more of the arm segments, stabilizers, counter weights, and/or mast; and a sensor at one or more rotational axes to measure the angle of the pivot arm segments in fluid communication with the controller.

In another embodiment, a printing system includes a machine frame having a plurality of stabilizers coupled to the machine frame and moveable from a retracted position to an extended position to engage the ground wherein one or more of the stabilizers may be configured to extend radially outward from the machine frame while extending toward the ground; two articulating arm segments with the proximal arm segment rotationally coupled to the machine frame, wherein both segments are configured to pivot within planes parallel to the plane of material deposition; a counter weight coupled to one or more articulating arm segments; a material line coupled to the articulating arm segments and configured to convey construction material therethrough; a mast coupled to the distal arm segment and configured to move at least perpendicular (in the z-direction) to the rotational plane of the arm segments, a printhead coupled to the mast and in fluid communication with the material line to receive the material and to dispense the material; and a controller configured to receive 3D printing information and to convert the 3D printing information into positional coordinates of the printhead, wherein the controller is configured to cause movement of the mast and one or both articulating arm segments to position the printhead based at least on the positional coordinates.

In another embodiment, a printing system may include a machine frame configured to be lifted away from the ground by engaging stabilizers to lift the machine frame away from the ground wherein the machine frame may have a surface parallel to the horizontal plane in both the neutral position and the lifted position; at least two articulating arm segments with the proximal arm segment rotationally coupled to the machine frame and configured to pivot about a rotational axis that is off-center in at least two dimensions from the machine frame, wherein all arm segments are configured to pivot within planes parallel to the plane of material deposition; a counter weight coupled to one or more articulating arm segments; a support member coupled to the machine frame and coupled to the articulating arm segments, wherein the articulating arm segments may be configured to be lifted further away from the ground by engaging the support member to lift the articulating arm segments in a vertical direction and/or wherein the support member may be coupled to the machine frame and rotatably coupled to the articulating arm segments to allow at least two degrees of movement relative to the support member; a material line coupled to at least two of the articulating arm segments and configured to convey a material therethrough; a printhead coupled to one or more arm segments and in fluid communication with the material line to receive material and to dispense the construction material; a position sensor coupled to the printhead and configured to wirelessly communicate the 3D position of the printhead to a receiver which may be disposed in a fixed position on the machine frame or disposed apart from the machine; and a controller configured to receive 3D printing information and to convert the 3D printing information into positional coordinates of the printhead, wherein the controller is configured to cause movement of the one or more articulating arm segments, stabilizers, ground engaging elements, and support members to position the printhead based at least on the positional coordinates.

This invention differs from other construction 3D printers in that the device relies solely on rotational motion in planes parallel to the XOY plane, the plane of deposition, in order to move the printhead along the specified trajectory within each layer. Because rotation is parallel to the plane of deposition, no reference rails or vertical rotation is required for motion within the XOY plane, and each rotational axis can be easily sealed off from precipitation and construction debris. Vertical motion, from one print layer to the next, occurs either through moving the base, arm segments, or the printhead in the direction of the Z-axis. By focusing XOY motion on rotations parallel to the plane of deposition during each layer of printing, improved efficiency, precision, and accuracy may be obtained.

Also described herein, among other things, is a machine comprising: a frame; a plurality of articulating arm segments consisting of: a proximal arm segment, the proximal arm segment coupled to the frame and configured to pivot at least in a plane substantially parallel with the plane of material deposition; one or more additional arm segments, each of said additional arm segments consecutively and pivotally coupled to a previous arm segment in the plurality of articulating arm segments, and configured to pivot in planes substantially parallel with the plane of material deposition; a material line, the material line coupled to at least one arm segment of the one or more additional arm segments, and configured to convey a material therethrough; and at least one printhead, with at least one printhead coupled to at least one arm segment in the one or more additional arm segments, and configured to be in fluid communication with the material line to receive the material and to dispense the material; wherein the material comprises a construction material.

In an embodiment of the machine, the machine further comprises a controller configured to receive 3D printing information and to convert the received 3D printing information into positional coordinates of at least one printhead, wherein the controller is configured to cause movement of at least one arm segment in the plurality of articulating arm segments to position at least one printhead based on the positional coordinates.

In an embodiment of the machine, the machine further comprises a position sensor coupled to the printhead and wirelessly communicating its position to a receiver disposed in a fixed position near the frame.

In an embodiment of the machine, the controller is configured to convert the 3D printing information into X and Y positional coordinates of said printhead based on the following algebraic relationships:

$$X = A^* \cos(\alpha) + B^* \cos(\alpha + \pi - \beta)$$

$$Y = A^* \sin(\alpha) + B^* \sin(\alpha + \pi - \beta)$$

$$v = \alpha + \beta + \pi$$

or the following inverse kinematics relationships:

$$\beta = \arccos((X^2 + Y^2 - A^2 - B^2)/(-2^* A^* B))$$

$$\alpha = \arcsin(B^* \sin(\beta)/\sqrt{X^2 + Y^2}) + \arctan(Y/X);$$

wherein A is a length of the proximal arm segment from a coordinate origin, defined as a rotational axis of the proximal arm segment relative to the machine frame, to a second rotational axis, said second rotational axis connecting the proximal arm segment to an arm segment in said one or more additional arm segments; wherein B is a length from said second rotational axis to said printhead; wherein alpha, $\alpha$, is an angle between a line from said coordinate origin to said second rotational axis and a line defined by the X-axis at said coordinate origin; wherein beta, $\beta$, is an angle between a line from said coordinate origin to said second rotational axis and a line from said second rotational axis to the printhead; wherein pi, $\pi$, is 180 degrees expressed in radians; wherein nu, $\nu$, is an angle of the printhead relative to the frame; and wherein the XOY plane is the plane of material deposition.

In an embodiment of the machine, a sensor in fluid communication with the controller measures at least an angle of one or more rotational axes between the frame and the proximal arm segment and between arm segments in said one or more additional segments.

In an embodiment of the machine, the machine further comprise a support member coupled to the frame and coupled to the proximal arm segment, wherein the plurality of articulating arm segments are configured to be lifted away from the frame by engaging the support member to lift the plurality of articulating arm segments in at least in the z-direction, perpendicular to the plane of material deposition.

In an embodiment of the machine, two or more arm segments in the plurality of articulating arm segments are configured to pivot about a rotational axis that is off-center in at least two dimensions of the frame.

In an embodiment of the machine, the support member is coupled to the frame and rotatably coupled to the plurality of articulating arm segments to allow at least two degrees of movement relative to the support member.

In an embodiment of the machine, the machine further comprise a counter weight coupled to one or more articulating arm segments in said plurality of articulating arm segments.

In an embodiment of the machine, the controller is configured to adjust a position of the counter weight based at least on an extension of one or more articulating arm segments.

In an embodiment of the machine, a mast is coupled to an arm segment of said plurality of articulating arm segments, and configured to move at least in the z-direction, perpendicular to the plane of material deposition, thereby raising or lowering at least one printhead.

In an embodiment of the machine, the machine further comprises a fastener dispensing implement coupled to one or more articulating arm segments in said plurality of articulating arm segments, and configured to dispose one or more fasteners or a contiguous fastening material on top of or at least partially through said material.

In an embodiment of the machine, the frame further comprises a plurality of stabilizers coupled to the frame and moveable from a neutral position in which said plurality of stabilizers are in a retracted position to a lifted position in which said plurality of stabilizers are extended to engage the ground.

In an embodiment of the machine, one or more of the stabilizers is configured to extend radially outward from the frame toward the ground.

In an embodiment of the machine, the frame has a surface parallel to the horizontal plane in both the neutral position and the lifted position.

In an embodiment of the machine, the machine further comprises a plurality of ground engaging elements to facilitate movement of the frame, wherein the plurality of ground engaging elements includes one or more of a wheel and/or one or more of a track.

DESCRIPTION OF THE PREFERRED EMBODIMENT(S)

The following detailed description and disclosure illustrates by way of example and not by way of limitation. This description will clearly enable one skilled in the art to make and use the disclosed systems and methods, and describes several embodiments, adaptations, variations, alternatives and uses of the disclosed systems and methods. As various changes could be made in these constructions without departing from the scope of the disclosures, it is intended that all matter contained in the description or shown in the accompanying drawings shall be interpreted as illustrative and not in a limiting sense.

Described herein are systems, methods, and devices for structural 3D printing. One embodiment includes a machine frame having a plurality of ground engaging elements to facilitate movement of the machine frame, two or more articulated arm segments coupled to the machine frame wherein the arm segments pivot within planes substantially parallel to the plane of material deposition, a material line coupled to the arm segments and configured to convey a construction material therethrough, a printhead coupled to the distal arm segment and in fluid communication with the material line to receive the material and to dispense the material, and a controller configured to receive 3D printing information and to convert the 3D printing information into positional coordinates of the printhead, wherein the controller is to cause movement of the articulated arm segments and support members to position the printhead while incorporating sensor feedback regarding the rotation of each pivotal axis and position of the printhead and wherein vertical movement of the printhead is facilitated through one or more mechanisms such as elevating the machine platform, elevating the articulating arm segments, and/or the incorporation of a mast on one or more of the arm segments.

Figure 1:
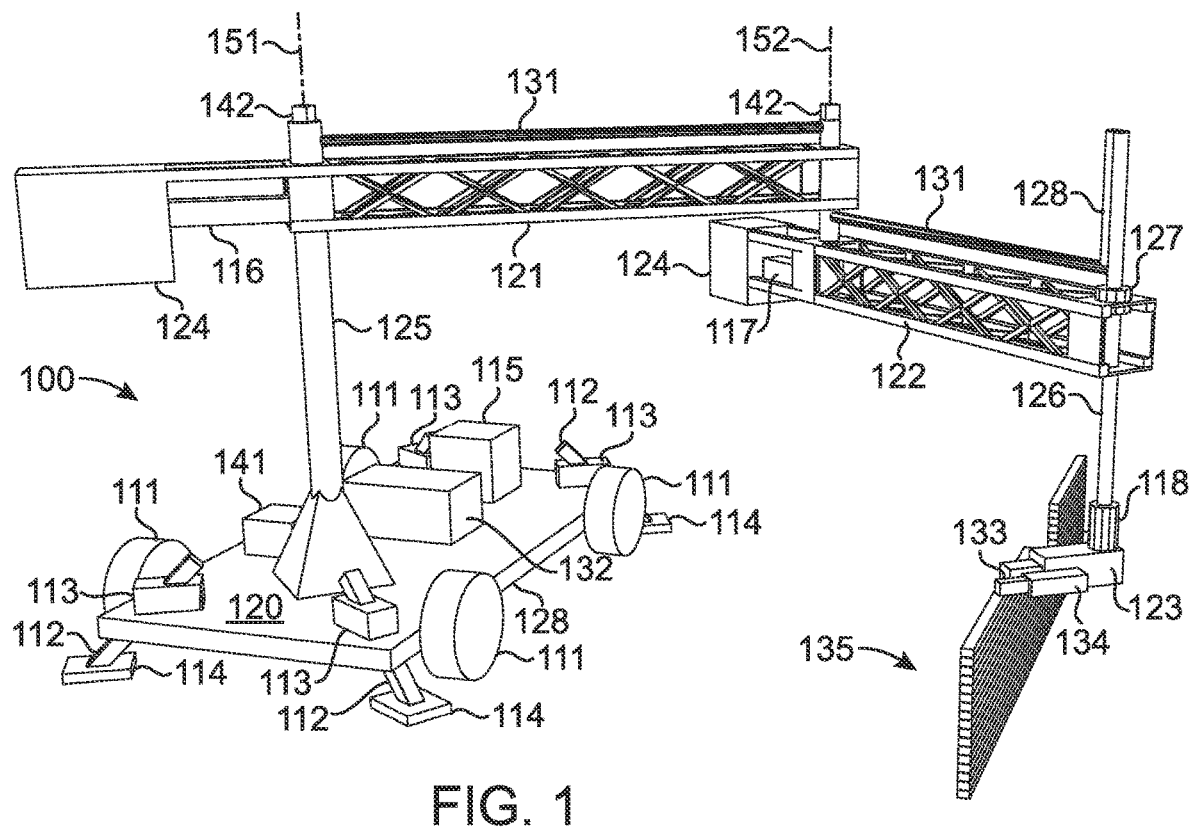
FIG. 1. is a perspective view of a machine configured with a 3D printing system in accordance with aspects of the disclosure.

Referring to the figures, FIG. 1 illustrates an aspect of an additive manufacturing system or structural three dimensional (3D) printing system 100 in accordance with the disclosure. The printing system 100 may be used, for example, to form structural components such walls, enclosures, foundations, and the like. The printing system shown in FIG. 1 may be a portable system mounted on a machine 100, such as a tracked utility machine, wheeled machine, or any other suitable machine. As another example, the printing system 100 may be mounted on a fixed structure, such as a stationary frame, via a movable boom.

In one embodiment, a printing system 100 may include a machine frame 120 having a plurality of ground engaging elements 111 to facilitate movement of the machine frame 120, wherein the plurality of ground engaging elements 111, as shown in FIG. 1, includes one or more of a wheel and/or one or more of a track. As an example, the ground engaging elements 111 may include a wheel (or plurality thereof) to facilitate movement of the machine frame 120 across the ground. A power source 115, such as an internal combustion engine, an electric motor or the like, may be coupled to the machine frame 120 and may be configured to generate a power output for operating the printing system 100 and/or driving at least one ground engaging element 111.

In an aspect, a plurality of stabilizers 112 may be coupled to the machine frame 120 and moveable from a retracted position to an extended position to engage the ground. As shown in FIG. 1, four stabilizer legs 112 may be movably coupled to the machine frame 120. As an example, each of the stabilizer legs may include a foot or pad 114 configured to engage the ground to effect stabilization of the machine frame 120. As a further example, each of a plurality of motors 113 such as gearmotors or hydraulic motors or the like may be configured to cause a respective one of the stabilizer legs to extend toward the ground relative to the machine frame 120. As such, when the stabilizer legs are extended to engage the ground, further extension by the motors 113 lifts the machine frame 120 and spaces and balances the machine frame 120 from the ground.

In this embodiment, three articulating arm segments 121, 122 and 123 include the proximal arm segment 121 rotationally coupled to the machine frame 120 via a support member 125, the arm segment 122 rotationally coupled to arm segment 121, and the arm segment 123 coupled to arm segment 122 wherein all arm segments rotate within planes parallel to the plane of material deposition and combine to position the printhead 133 as required. For example, the length of each arm segment 121 and 122 may each be in the range of 5 to 10 meters, while arm segment 123 may be less than one meter in length. Arm segments a fraction of a meter or arm segments longer than 20 meters may be practical, especially in a multi-arm configuration used to construct larger buildings.

In an aspect, the pivoting mechanism for each arm segment 121, 122, and/or 123 may be disposed of a lubricated bushing on a shaft or a sealed spindle and housing arrangement (not shown) featuring double-row tapered roller bearings or ball bearings to minimize frictional resistance and improve the positional placement accuracy of the material within each layer of the printed structure, 135. In an aspect, the proximal arm segment 121 may also be pivotally coupled to the support member 125 and the machine frame 120 by a bracket (e.g., swing pivot) as may be known in the art. In an aspect, each arm segment 121, 122 and 123 may include one or more electric motors 116, 117 and 118, respectively, to control the rotation of each arm segment. In another aspect the electric motors 116, 117 and 118 could be combined with speed-reducing gearboxes or slewing drives or replaced with hydraulic motors and valves to control the articulation of the arm segments 121, 122 and 123. Each arm segment may include a distal end to which an implement, such as a printhead 133 and/or a fastener dispensing implement 134, may be mounted. The arm segments 121, 122 and 123 may accommodate other implements such as, for example, a finishing implement to effect a surface treatment. The articulating arm segments may be configured to pivot about a support member 125 that may be off-center in at least one dimension from the center of the machine frame 120, as shown in FIG. 1.

A counter weight 124 may be coupled to one or more articulating arm segments 121, 122 and 123 and may be disposed along the arm segments 121, 122 and 123, for example, at the proximal end of each arm segment. As an example, the position and/or mass of the counter weight 124 may be adjusted based upon the position and trajectory of the arm segments 121, 122 and 123. As a further example, the position of the counter weight 124 may be automatically adjusted such as moving the counter weight 124 toward or away from the proximal end of the arm (e.g., using a motor and/or a hydraulic cylinder) to facilitate improved balance and positional accuracy of the printhead 133.

A mast 126 may be coupled to the second or later arm segment 122 or 123 and configured to move at least perpendicular (in the z-direction) to the rotational plane of the arm segments 121, 122 and 123 thereby raising the printhead 133 between layers of the structure 135. In an embodiment, the mast 126 may be equipped with a hydraulic cylinder or with an electric motor 127 coupled to a ball-screw 128 to facilitate vertical movement of the printhead 133. In another embodiment, the mast 126 may be configured to accept extensions that may be inserted between the proximal and distal ends of the mast 126 with pins, clamps, or the like, in order to extend the length of the mast 126. For example, the insertion of a mast extension may facilitate the printing of a basement or another aspect of the structure 135. A typical extension length may be between 1.5 and 3 meters, but other lengths may be used.

A material line 131 may be coupled on to or within one or more of the articulating arm segments 121, 122 and 123 and/or the mast 126 and configured to convey a material 132 therethrough to a printhead 133. A material line 131 may be disposed along a length of the arm segments 121, 122 and 123 and/or the mast 126 and may provide fluid communication between the printhead 133 and the source of construction material 132. The source of construction material 132 may be disposed on the machine frame 120 or may be disposed apart from the machine frame 120. The material line 131 may comprise a combination of steel pipes, rubber hoses, connectors or the like. The material line 131 may be secured to the arm segments 121, 122 and 123 and the mast 126 using couplers or fixtures known in the art and may be disposed in a foldable or coilable manner to manage the rotation of the material line 131 or other lines such as a pneumatic or hydraulic pressure line and/or electrical wires. Various materials may be provided via the material line 131 such as a cementitious material or other structural or coating material. The source of construction material 132, the material line 131, and/or the printhead 133 may include a pump, auger, or similar mechanism (not shown) to assist in movement of the material 132. Operation of the pump, auger, or similar mechanism may be controlled by a controller 141. Additionally, the source of construction material 132, the material line 131, and/or the printhead 133 may include a valve or similar mechanism (not shown) to control movement of the material 132. Operation of the valve or similar mechanism may be controlled by the controller 141.

Figure 2:
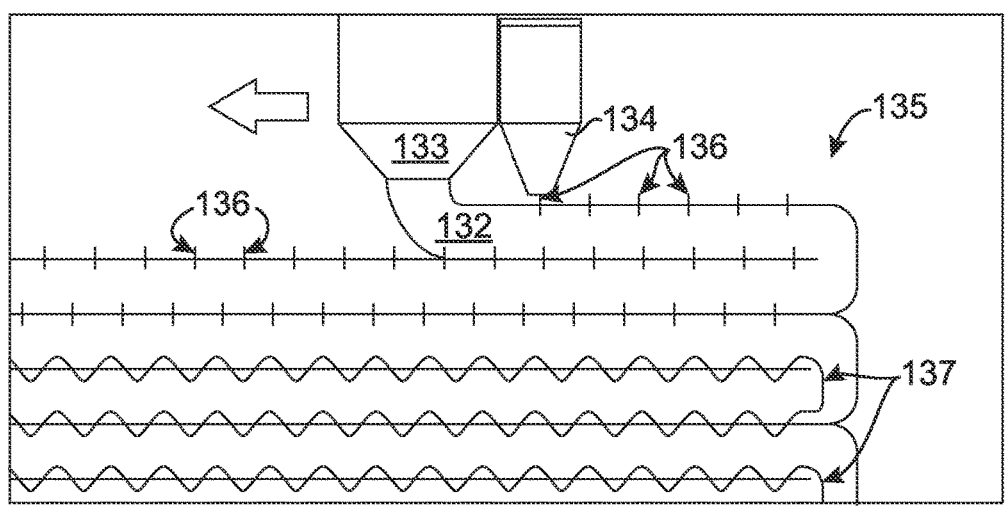
FIG. 2. is a close up view of the printhead and fastener dispensing implement embedding nails and/or wire placed within or partially through the material.

A printhead 133 may be coupled to distal arm segment 123 and in fluid communication with the material line 131 to receive the construction material 132 and to dispense the construction material 132 onto the printed structure 135. In another embodiment, a fastener dispensing implement 134 may be coupled to one or more articulating arm segments 121, 122 and 123 and/or the mast 126 and configured to dispose one or more fasteners or a contiguous fastening material on top of or at least partially through the deposited material 132. In one embodiment, depicted in FIG. 2., the fasteners may be individual nails or wire segments 136 or the fastening material may be a contiguous shaped wire 137 embedded between layers to facilitate greater bonding between printed layers. The fastener dispensing implement 134 may be equipped with a wire cutoff mechanism and/or a wire coiling mechanism to facilitate engagement of the fastener into the material. In another aspect, a cementitious material, such as an adhesive, may be deposited from the fastener dispensing implement 134 to facilitate interlayer bonding of the material 132.

A controller 141 may be configured to receive 3D printing information regarding a structure 135 and to convert the 3D printing information into positional coordinates of the printhead, wherein the controller 141 may be configured to cause movement of the articulating arm segments 121, 122 and 123 to position the printhead 133 based at least on the positional coordinates. A controller 141 may be in electrical communication with various components of the machine such as the motors 113, the mast 126, the printhead 133, the fastener dispensing implement 134, and the like. The controller 141 may be configured to control the movement of the arm segments 121, 122 and 123, for example, by selectively actuating one or more of the motors 116, 117 and 118.

A sensor 142 may be positioned at one or more rotational axes between the machine frame 120 and the proximal arm segment 121 or between each subsequent arm segment to measure the relative pivot angle of the arm segments 121, 122 and 123 in fluid communication with the controller 141. In an aspect, the controller 141 may incorporate the feedback from the sensors 142 in order to better improve the placement accuracy of the printhead 133. The controller 141 may be configured to adjust the position of the counter weight 124 based at least on the position and trajectory of one or more articulating arm segments 121, 122 and 123.

The Z-axis coordinate of machine 100's 3D printing coordinates may be mapped to a height of the printhead 133 including the arm segments 121, 122 and 123, the mast 126, and the machine frame 120 wherein the controller 141 may cause the motors 113 to activate and lift or lower the machine frame 120 relative to the stabilizer legs 112 and/or the controller 141 may cause the motor 127 to activate and lift or lower the mast 126 thereby lifting or lowering the printhead 133.

As an illustrative example, the machine may be positioned at a site where a structure 135 may be manufactured using 3D printing. The structure 135 may be designed for construction using standard 3D printing coordinates. Such coordinates may be received by the controller 141 and may be converted to the angular positions of the arm segments 121, 122 and 123. Accordingly, the controller 141 may control a flow of construction material 132 through the material line 131 to the printhead 133 for deposition. By controlling the rotation of each articulated arm segment 121, 122 and 123 within a series of horizontal planes, the printhead may be positioned to deposit the construction material 132 in a manner provided by the 3D printing coordinates. The construction material 132 may be deposited in a horizontal plane and may be layered by adjusting the height of the printhead 133 via the mast 126.

Figure 3:
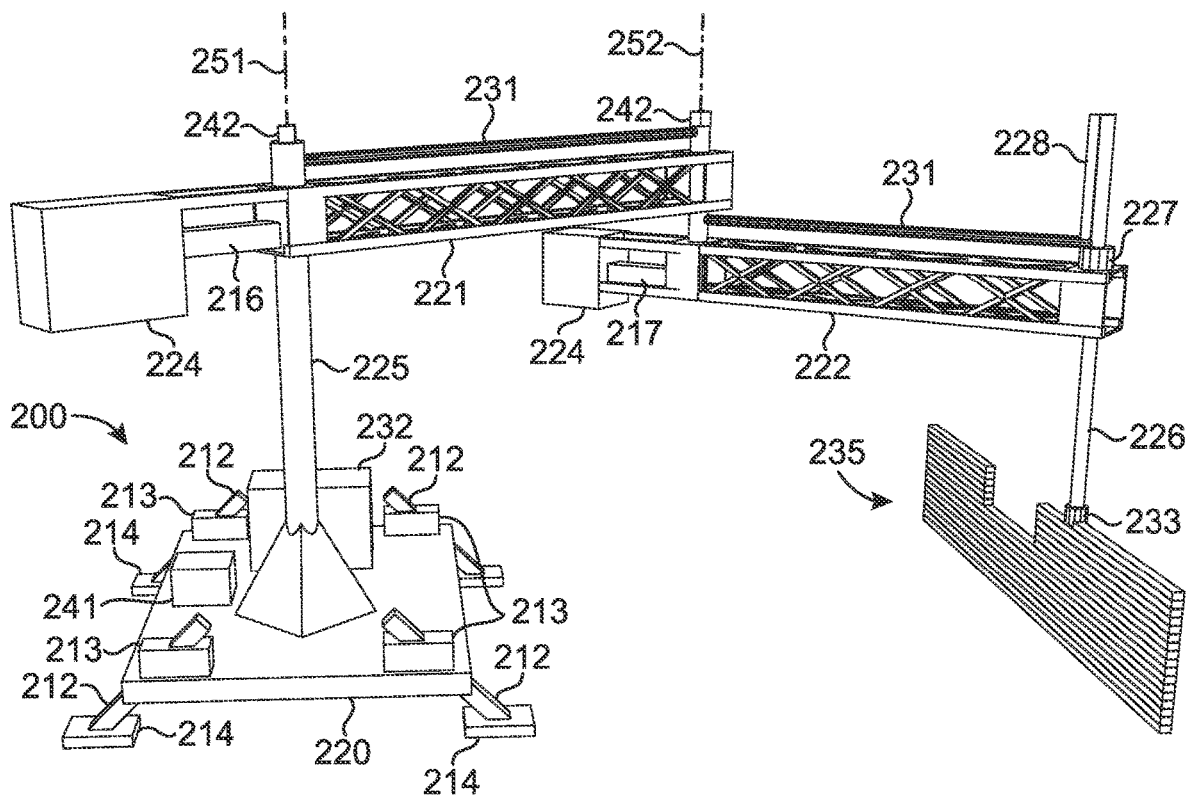
FIG. 3. is a perspective view of a machine configured with a 3D printing system in accordance with aspects of the disclosure.
Figure 4:
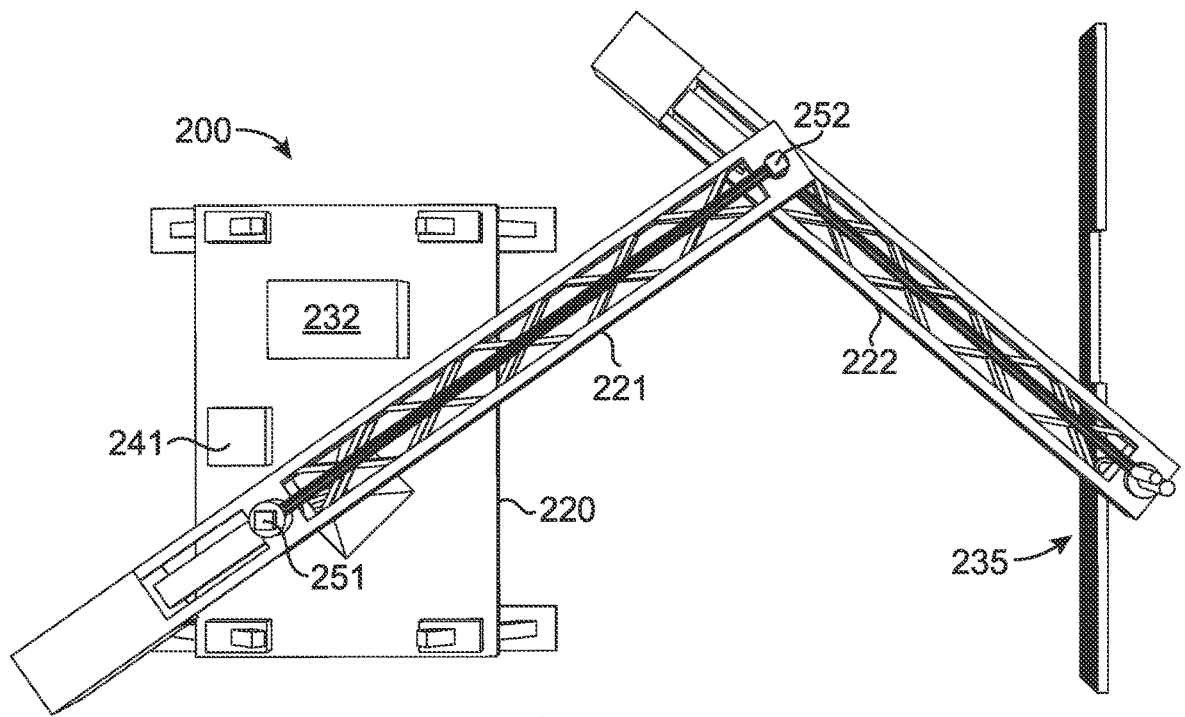
FIG. 4. is a diagrammatic top view of the machine of FIG. 3.

Referring to the figures, FIG. 3 and FIG. 4 illustrate an aspect of an additive manufacturing system or structural three dimensional (3D) printing system 200 in accordance with the disclosure. The printing system 200 may be used, for example, to form structural components such walls, enclosures, foundations, and the like.

In another embodiment, a printing system 200 may include a machine frame 220 having a plurality of stabilizers 212 coupled to the machine frame 220 and moveable from a retracted position to an extended position to engage the ground. As an example, each of a plurality of electric motors or gearmotors 213 may be configured to cause a respective one of the stabilizer legs 212 to extend toward the ground relative to the machine frame 220. Optionally one or more hydraulic cylinders may be used to cause extension of each stabilizer leg 212. Each stabilizer leg 212 may incorporate a foot or pad 214 to improve stability when engaging the ground. Accordingly, controlled engagement of the gearmotors 213 may be used to control the height and balance of the machine frame 220. One or more of the stabilizers 212 may be configured to extend radially outward from the machine frame 220 while extending toward the ground.

In one embodiment, two articulating arm segments 221 and 222 with the proximal arm segment 221 coupled to the machine frame 220, with arm segment 222 coupled to the distal end of arm segment 221, and with both arm segments 221 and 222 configured to pivot within planes parallel to the plane of material deposition (e.g., the horizontal plane). In an aspect, the pivoting mechanism for each arm segment 221 and/or 222 may be disposed on a lubricated bushing on a shaft or a sealed spindle and housing arrangement (not shown) featuring double-row tapered roller bearings or ball bearings to minimize frictional resistance and improve the positional placement accuracy of the material 132. In an aspect, each arm segment 221 and/or 222 may include one or more electric motors 216 and 217, to control the articulation of each arm, respectively. In another aspect the electric motors 216 and 217 could be combined with speed-reducing gearboxes or slewing drives or replaced with hydraulic motors to control the articulation of the arm segments 221 and/or 222. Each arm segment 221 and 222 includes a distal end to which an implement, such as a printhead 233 may be mounted. The arm segments 221 and 222 may accommodate other implements such as, for example, a fastener dispensing implement to improve interlayer bonding or a finishing implement to effect a surface treatment.

A mast 226 may be coupled to the distal arm segment 222 and configured to move perpendicular (in the z-direction) to the rotational plane of the arm segments 221 and 222 to thereby raise or lower the printhead 233. In an aspect, the mast 226 may be equipped with a hydraulic cylinder or an electric motor 227 coupled to a ball-screw 228 to facilitate vertical movement of the printhead 233. In another aspect, the mast 226 may be coupled to the machine on a pivot or hinge to enable easier storage or transportation of the mast 226. In another aspect, mast 226 may also be configured to accept extensions that may be inserted between the proximal and distal ends of the mast 226 with pins, clamps or the like in order to extend the length of the mast 226. For example, the insertion of one or more mast extensions may facilitate the printing of a basement wall or another aspect of the structure 235 as required.

A material line 231 may be coupled to the articulating arm segments 221 and 222 and configured to convey a material 232 therethrough. Various materials may be provided via the material line 231 such as a cementitious material or other structural or coating material. The material line 231 may be disposed along a length of the arm segments 221 and 222 and may provide fluid communication between the printhead 233 and a source of construction material 232. The source of construction material 232 may be disposed of on the machine frame 220 or the source may be disposed apart from the machine frame 220. The material line 231 may comprise a combination of steel pipes, rubber hoses, connectors or a combination of those or similar devices known in the art. The material line 231 may be secured to and/or contained within the arm segments 221 and 222 using couplers known in the art and may be disposed of in a foldable or coilable manner to manage the rotation of the material line 231 or other lines such as a pneumatic pressure lines and/or electrical wires. The source of construction material 232, the material line 231, and/or the printhead 233 may include a pump, auger, or similar mechanism (not shown) to assist in movement of the material for deposition. Operation of the pump, auger, or similar mechanism may be controlled by a controller 241. Additionally, the source of construction material 232, the material line 231, and/or the printhead 233 may include a valve or similar mechanism (not shown) to control movement of the material 232. Operation of the valve or similar mechanism may be controlled by the controller 241. A printhead 233 may be coupled to the mast 226 and in fluid communication with the material line 231 to receive and to dispense the material 232.

A controller 241 may be configured to receive 3D printing information regarding a structure 235 and to convert the 3D printing information into positional coordinates of the printhead, wherein the controller 241 may be configured to cause movement of the two articulating arm segments 221 and 222 and to position the printhead 233 based at least on the positional coordinates. A controller 241 may be in electrical communication with various components of the machine such as the motors, sensors 242, hydraulic cylinders, and the like. The controller 241 may be configured to control the movement of the arm segments 221 and 222, for example, by selectively actuating one or more of the electric motors 216 and 217.

Figure 5:
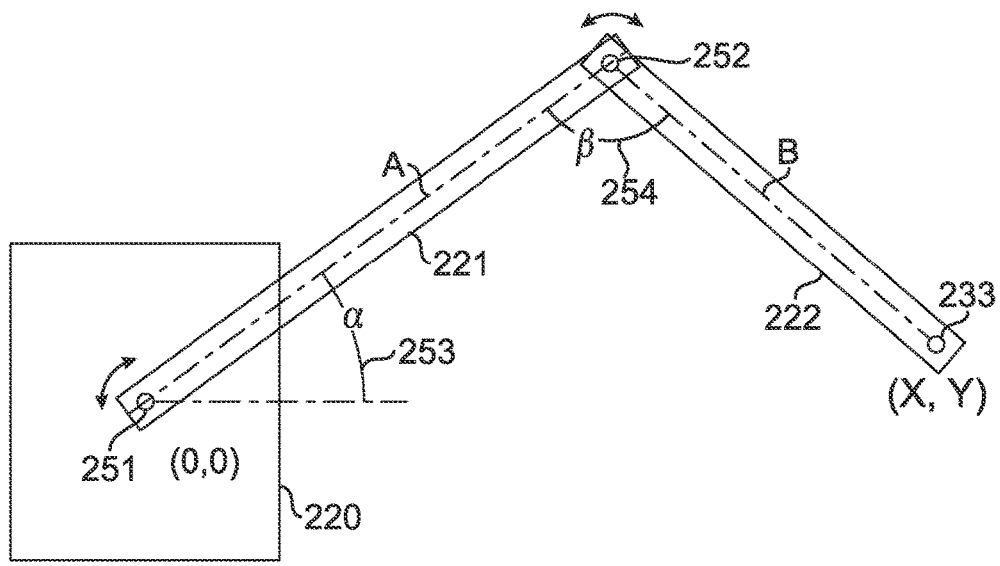
FIG. 5. is a schematic view representing the top plan view of FIG. 4.

The controller 241 may execute logic to control the motion of the arm segments 221 and 222 and the position of the printhead 233 at the required (X, Y) coordinates in the XOY or deposition plane based on the following relationships shown in FIG. 5 which represents the machine shown in FIG. 4:

$$\beta = \arccos((X^2+Y^2-A^2-B^2)/(-2*A*B))$$

$$\alpha = \arcsin(B*\sin(\beta)/\sqrt{X^2+Y^2}) + \arctan(Y/X)$$

where A is the length of the proximal arm segment 221 from the coordinate origin defined as the axis of rotation 251 of the proximal arm segment 221 relative to the machine frame 220, to the axis of rotation 252 between the arm segments 221 and 222, B is the length from the axis 252 to the printhead 233 at the center of where material 232 exits the extruder opening on the printhead 233, alpha 253, α, is the angle of the proximal arm segment 221 relative to coordinate origin (e.g. X=0 and Y=0) at the machine axis, and beta 254, β, is the angle from the proximal arm segment to the distal arm segment 222. Beta 254, β, is derived utilizing the law of cosines and, subsequently, alpha 253, α, is derived utilizing the law of sines. The controller 241 may cause the arm segments 221 and 222 to move in accordance with such relationships.

In another aspect, the controller 241 may execute logic to control the rotational orientation of the printhead 233 with respect to the arm segments 221 and 222. To achieve a more uniform deposition on the structure 235, the printhead 233 extruder opening may be rotated relative to the direction of travel of the arm segments 221 and 222. The required angle of the printhead 233 may be calculated by subtracting alpha 253, α, and π radians minus beta 254, β, from the angle of the trajectory of motion of the printhead 233 relative to the XOY plane as it deposits material onto the structure 235.

A Z-axis coordinate (e.g., the height of the printhead perpendicular to the deposition plane) of the 3D printing coordinates may be mapped to a height of the printhead 233 including the height of the machine frame 220 and the mast 226 relative to the bottom or initial printed layer of the structure 235.

As an illustrative example, the machine may be positioned at a site where a structure 235 may be manufactured using 3D printing. The 3D printed structure 235 may be designed for construction using standard 3D printing coordinates. Such coordinates may be received by the controller 241 and may be converted to the angular positions of the arm segments 221 and 222, as described herein. Accordingly, the controller 241 may control a flow of construction material 232 through the material line 231 to the printhead 233 for deposition. By controlling the rotation of each articulated arm segment 221 and 222 within a horizontal plane, the printhead may be positioned to deposit the construction material 232 in a manner provided by the 3D printing coordinates. The construction material 232 may be deposited in a horizontal plane and may be layered by adjusting the height (the Z-axis) of the printhead 232 from one layer to the next layer via vertical movement of the mast 226.

Figure 6:
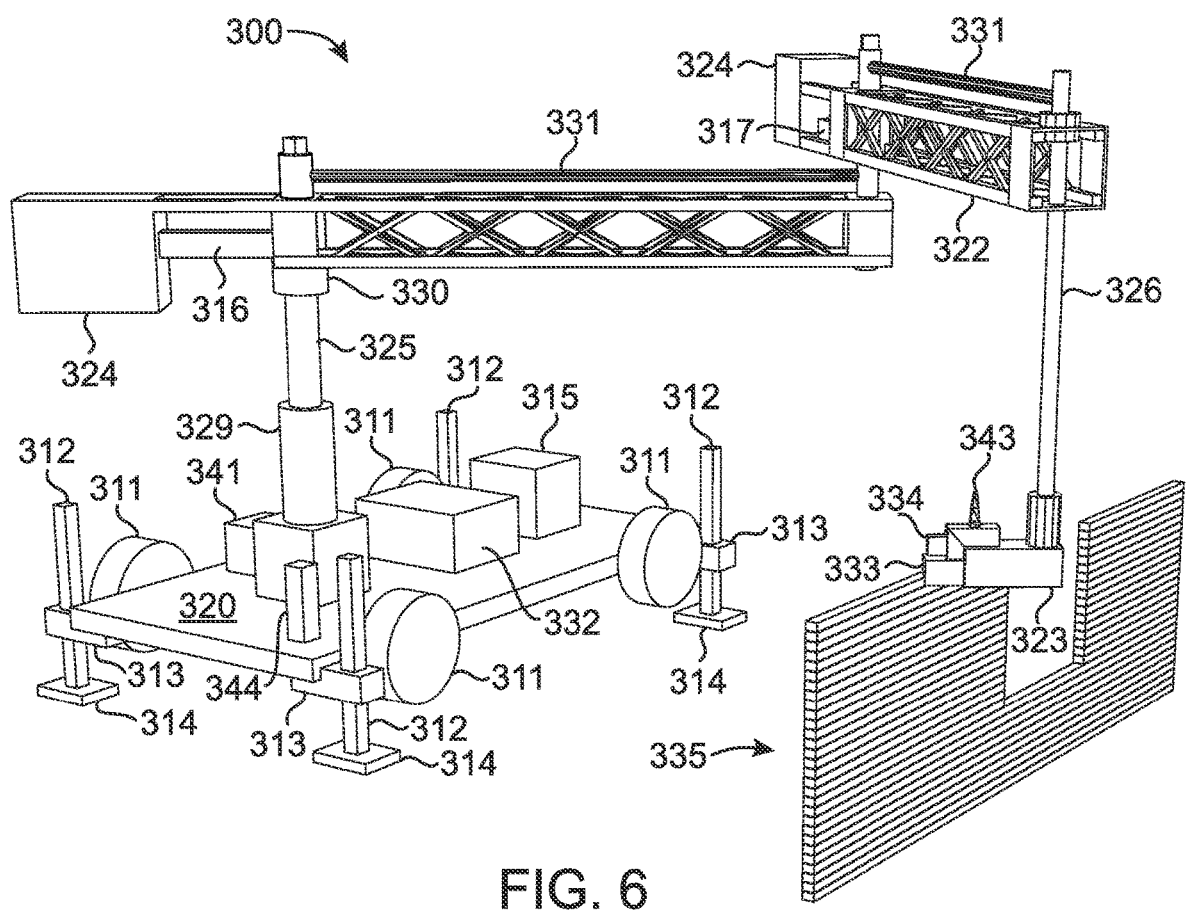
FIG. 6. is a perspective view of a machine configured with a 3D printing system in accordance with aspects of the disclosure.
Figure 7:
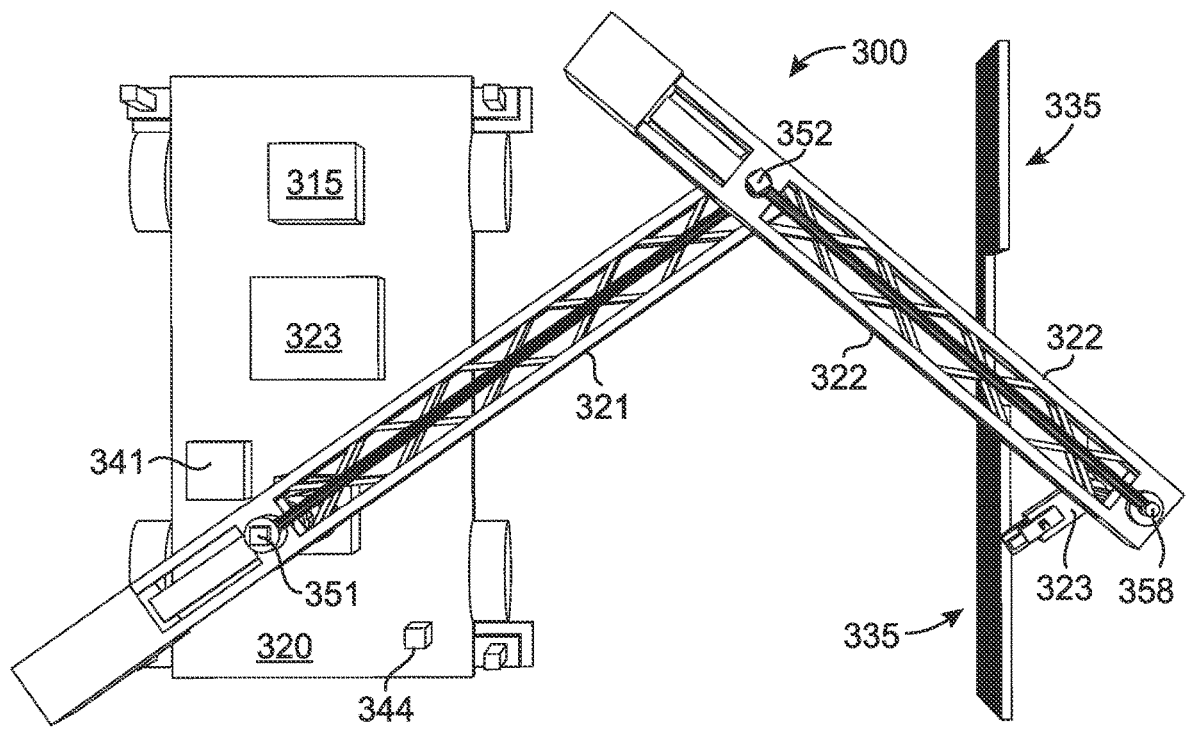
FIG. 7. is a diagrammatic top view of the machine of FIG. 6.

Referring to the figures, FIG. 6 and FIG. 7 illustrate an aspect of an additive manufacturing system or structural three dimensional (3D) printing system 300 in accordance with the disclosure. The printing system 300 may be used, for example, to form structural components such walls, enclosures, foundations, and the like. The printing system 300 shown in FIG. 6 and FIG. 7 may be a portable system mounted on a machine 300, such as a tracked utility machine, wheeled machine, or any other suitable machine. As another example, the printing system 300 may be mounted on a fixed structure, such as a stationary frame.

In another embodiment, a printing system 300 may include a machine frame 320 configured to be lifted away from the ground by engaging a plurality of stabilizer legs 312, as shown in FIG. 6. In an aspect, each of the stabilizer legs 312 may include a foot or pad 314 configured to engage the ground to effect stabilization of the machine frame 320. As a further example, each of a plurality of motors 313, or gearmotors or hydraulic cylinders may be configured to cause extension of a plurality of stabilizer legs 312 to extend toward the ground relative to the machine frame 320. As such, when the stabilizer legs 312 are extended to engage the ground, further extension by the motors 313 lifts the machine frame 320 and spaces the machine frame 320 from the ground. Accordingly, controlled engagement of the motors 313 may be used to control the height of the machine frame 320 and thereby the arm segments 321, 322 and 323 and thereby the printhead 333 along the Z-axis. The machine frame 320 may have a surface parallel to the horizontal plane or the deposition plane, e.g., the plane formed by the immediate ground slope, in both the neutral position and the lifted position. In another aspect, a ratcheting mechanism may be incorporated into each motor 313 and employed to raise the platform 320 up a predefined height per segment of ratcheting such as one centimeter per ratchet. A safety interlock ensures that the machine may only travel upwards, and not downwards, unless specific commands may be executed in a specific order to allow the machine to decrease in height relative to the ground level.

In certain aspects, as the position of the machine frame 320 reaches a maximum height of the stabilizer legs or a predetermined height, additional leg extenders may be coupled to the vertical end of each of the stabilizer legs 312 to provide additional lift height for the machine frame 320. Various coupling mechanisms may be used such as bolts, clamps, slip fits, and the like to secure the additional leg extenders to the respective stabilizer legs. As an example, the length of the extenders may be configured based on the structural design (e.g., one additional story (level) to be added to a structure per extender). A typical length may be 3 meters, though other lengths may be used.

Three articulating arm segments 321, 322 and 323 may be configured with the proximal arm segment 321 coupled to the machine frame 320 with all segments 321, 322 and 323 configured to pivot within planes parallel to the plane of material deposition. The length of each arm segment may be in the range of 5 to 11 meters, though arm segments well less than 1 meter or segments longer than 20 meters may be practical, especially in a multi-arm configuration. In another aspect, the arm segment 321 may be pivotally attached to a support member 325 on the machine frame 320 by a bracket or pivot mechanism 330 (e.g., swing pivot) as may be known in the art.

In an aspect, a support member 325 may be coupled to the machine frame 320 and coupled to the articulating arm proximal segment 321 wherein the articulating arm segments are configured to be lifted away from the ground by engaging the support member 325 to lift the articulating arm segments 321, 322 and 323 together in a vertical direction. In an aspect, the support member 325 may be equipped with an electric motor and jack-screw 329, or a hydraulic cylinder or similar mechanism fitted with a lock mechanism to facilitate safe vertical movement. In another aspect, an apparatus such as a scissor lift may be used in addition to or instead of the support members 325 and 329 to facilitate greater vertical movement of the articulating arm segments 321, 322, and 323 as required between layers or vertical sections (e.g., between floors or partial floors) of the 3D printed structure 335.

In an aspect, the proximal arm 321 may be configured to pivot about a support member 325 that may be off-center in at least two dimensions of the machine frame 320. A support member 325 may be coupled to the machine frame 320 and rotatably coupled to the arm segment 321 to allow at least two degrees of movement relative to the machine frame 320. An off-center positioning and/or tilting of the support member 325 may facilitate a further reach of the combined arm segments 321, 322 and 323 than a configuration with a centered support member 325 (e.g., due to the encumbrance of one or more stabilizer legs).

A counter weight 324 may be coupled to one or more articulating arm segments 321, 322 and 323. The counter weight 324 may be disposed along the arm segments 321, 322 and 323, for example, at a proximal end of each arm segment. As an example, the position and/or mass of the counter weight 324 may be adjusted based upon the position and/or trajectory of the arm segments 321, 322 and 323 by a controller 341.

A material line 331 may be coupled to one or more of the articulating arm segments 321, 322 and/or 323 and configured to convey a material 332 therethrough to the printhead 333. The material line 331 may be disposed along a length of the arm segments 321, 322 and 323 and may provide fluid communication between the printhead 333 and a source of construction material 332. The source of construction material 332 may be disposed on the machine frame 320 or may be disposed apart from the machine frame 320. Various materials may be provided via the material line 331 such as a cementitious material or other structural or coating materials. The material line 331 or other lines such as a pneumatic pressure line and/or electrical lines may be secured on or through the arm segments 321, 322 and 323 using couplers known in the art. The source of construction material 332, the material line 331, and/or the printhead 333 may include a pump, auger, or similar mechanism (not shown) to assist in movement of the material 332. Operation of the pump, auger, or similar mechanism may be controlled by a controller 341.

A printhead 333 may be coupled to the distal arm segment 323 and in fluid communication with the material line 331 to receive the construction material 332 and to dispense the construction material 332. The arm segments 321, 322, and/or 323 may accommodate other implements such as, for example, a fastener dispensing implement 334 to improve interlayer bonding or a finishing implement to effect a surface treatment.

Figure 8:
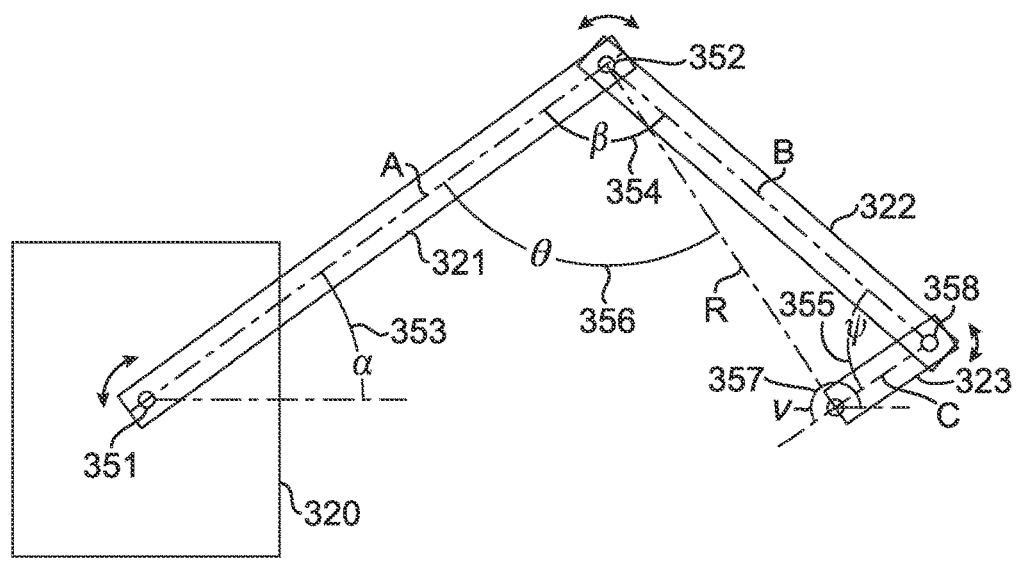
FIG. 8. is a schematic view representing the top plan view of FIG. 7.

The controller 341 may execute logic to control the motion of the arm segments 321, 322 and 323 to position the printhead 333 and/or a fastener dispensing implement 334 in the XOY plane based on the following relationships shown in FIG. 8 which is a schematic of FIG. 7:

$$X = A^*\cos(\alpha) + B^*\cos(\alpha+\pi-\beta) + C^*\cos(\alpha+\beta+\psi)$$

$$Y = A^*\sin(\alpha) + B^*\sin(\alpha+\pi-\beta) + C^*\sin(\alpha+\beta+\psi)$$

$$\nu = \alpha + \beta + \psi$$

and inverse kinematics relationships of a multi-arm segment configuration:

$$\Theta = \arccos((X^2+Y^2-A^2-R^2)/(-2^*A^*R))$$

$$\alpha = \arcsin(R^*\sin(\theta)/\sqrt{X^2+Y^2}) + \arctan(Y/X)$$

where A is the length of the proximal arm segment 321 from the coordinate origin defined as the rotational axis 351 of the proximal arm segment 321 relative to the machine frame 320, to the rotational axis 352 between the arm segments 321 and 322, B is the distance between the rotational axis 352 and the rotational axis 353 between the arm segments 322 and 323, C is the length from the rotational axis 353 between arm segments 322 and 323 to the printhead 333 at the center of where material 332 exits the printhead 333, R is the distance from the rotational axis 352 between arm segments 321 and 322 to the printhead 333 at the center of where material 332 exits the printhead 333 (calculated through use of the law of cosines given an angle, psi 355, $\psi$), alpha 353, $\alpha$, is the angle of the proximal arm segment relative to coordinate origin at the machine axis, beta 354, $\beta$, is the pivot angle about the rotational axis 352 between the proximal arm 321 and second arm 322, psi 355, $\psi$, is the angle about the rotational axis 353 between the second arm segment 322 and distal arm 323, theta 356, $\theta$, is the angle from the proximal arm segment 321 to the constructed line, R, between the rotational axis 352 to the printhead 333, and nu, 357, $\nu$, is the resulting angle of the printhead relative to the machine frame in the XOY plane. The controller 341 may cause the arm segments 321, 322 and 323 to move in accordance with such relationships.

In another aspect, the controller 341 may execute logic to control the rotational orientation of the extruder opening on the printhead 333 with respect to the arm segments 321, 322, and 323. The extruder opening may be rotated relative to the direction of travel of the arm segments. The required angle of the extruder opening on printhead 333 may be calculated by subtracting nu, 357, ν, from the angle of the trajectory of motion of the printhead 333 relative to the XOY plane as it deposits material onto the structure 335.

A Z-axis coordinate of 3D printing coordinates may be mapped to a height of the printhead 333 including the arm segments 321, 322 and 323, the support member 325, and the machine frame 320 wherein the controller 341 may cause the motors 313 to activate and lift or lower the machine frame 320 relative to the stabilizer legs 312 and/or the controller may cause the mechanism 329 to engage the support member 325 to lift the arm segments 321, 322 and 323.

A position sensor 343 may be coupled to the printhead 333 or the fastener dispensing implement 334 to wirelessly communicate its position to a receiver 344 located in a fixed position on or near the machine frame 320. For example, a widely available Global Positioning System (GPS) and/or a Real Time Kinematics (RTK) system may be used. In an aspect, the controller 341 may incorporate the feedback from the position sensor 343 in order to better improve the placement accuracy of the printhead 333 and the material 332 on to the final structure 335.

As an illustrative example, the machine may be positioned at a site where a structure 335 may be manufactured using 3D printing. The structure 335 may be designed for construction using standard 3D printing coordinates. Such coordinates may be received by the controller 341 and may be converted to the angular positions of the arm segments 321, 322 and 323. Accordingly, the controller 341 may control a flow of construction material 332 through the material line 331 and to the printhead 333 for deposition. By controlling the rotation of one or more articulated arm segments 321, 322 and/or 323 throughout a horizontal plane, the printhead may be positioned to deposit the construction material 332 in a manner provided by the 3D printing coordinates. The construction material 332 may be deposited in a horizontal plane and may be layered by adjusting the height of the machine frame 320 via the supports 312 or by adjusting the height of the arm segments 321, 322 and 323 via the support arm 325 by controlling the vertical lift mechanism 329. The position of the printhead 333 in both the XOY and in the z-direction may be adjusted based on the feedback from sensor 343 in order to improve the material placement accuracy on the printed structure 335.

Figure 9:
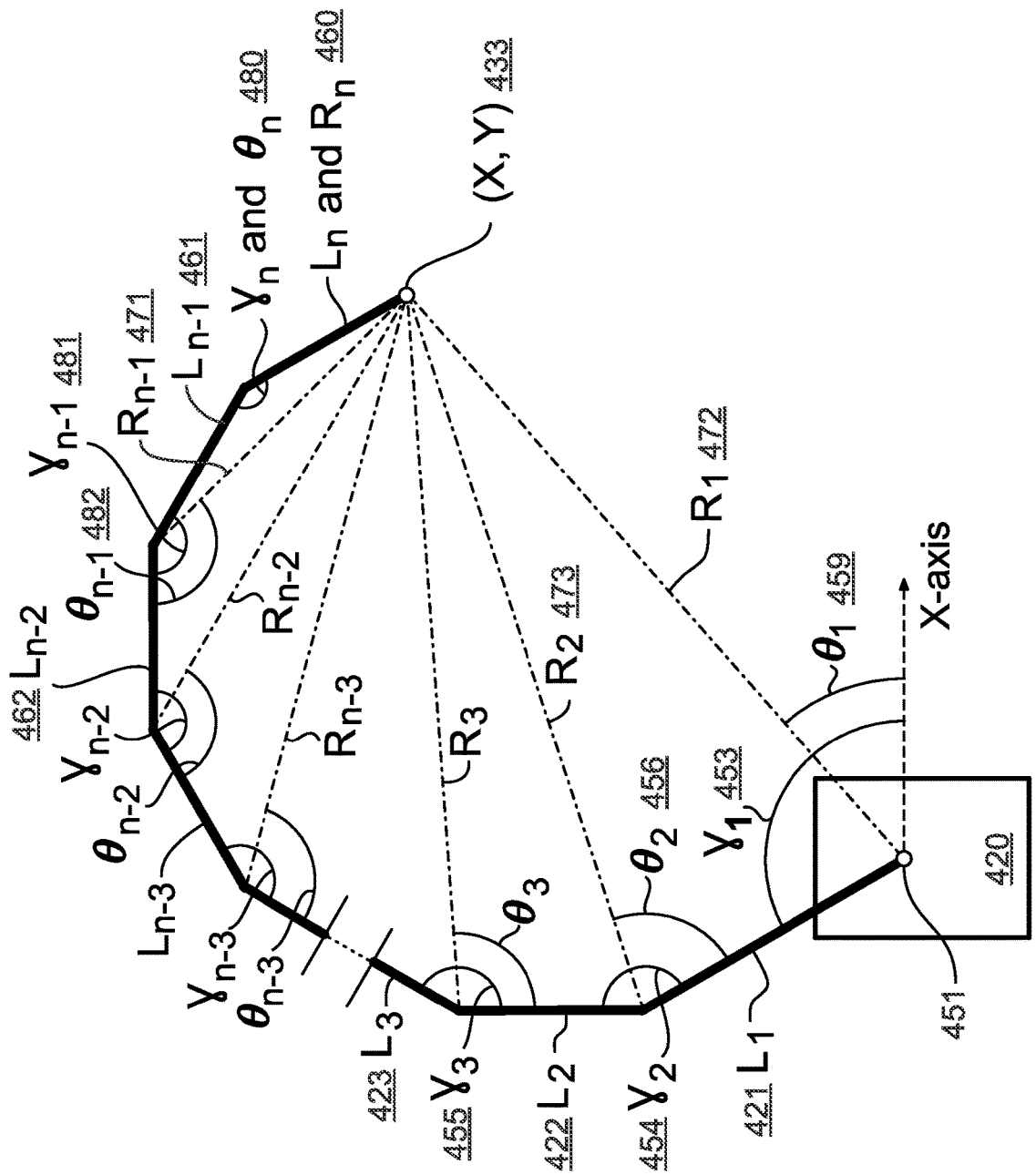
FIG. 9. is a schematic view representing the top plan view of a multi-arm system.

In a another embodiment, a machine with more than three arm segments, as represented schematically in FIG. 9 with 'n' arm segments rotating within planes parallel to the XOY plane, may be managed through a sequential calculation approach with methods similar to the approach as described herein for previous embodiments. In FIG. 9, with the distal arm in having length $L_n$ 460 coupled to the printhead 433, along with the preceding arm segment with length $L_{n-1}$ 461, the following calculations, based on the law of cosines and then the law of sines, may be used:

$$R_{n-1} = \sqrt{L_{n-1}^2 + L_n^2 - 2 L_{n-1} L_n \cos(Y_n)}$$

$$\Theta_{n-1} = Y_{n-1} - \arcsin(L_n \sin(Y_n)/R_{n-1})$$

where $R_{n-1}$ 471 is the distance from the printhead 433 to the rotational axis between the arm segments with lengths $L_{n-1}$ 461 and $L_{n-2}$ 462, gamma, 480, $Y_n$ is the angle between the line segments created by arm segments with lengths $L_n$ 460 and $L_{n-1}$ 461, and theta$_{n-1}$ 482, $\Theta_{n-1}$, is the angle between the arm segment with length $L_{n-2}$ 462 and the line segment $R_{n-1}$, 471.

Next, successive representative lengths, $R_{n-2}$ representing the length from the print head 433 to the rotational axis between arm segments with lengths $L_{n-3}$ and $L_{n-2}$ and its corresponding angle, theta$_{n-2}$, $\Theta_{n-2}$, representing the angle between the $L_{n-3}$ and $R_{n-2}$, can be calculated by incrementing n−1 to n−2 and n to n−1 in the preceding equations where the angle gamma$_{n-1}$ 481, $Y_{n-1}$ is the angle between the lines created by arm segments with lengths $L_{n-1}$ 461 and $L_{n-2}$ 462, etc. This process can be repeated for each previous segment with the following equations:

$$R_i = \sqrt{L_i^2 + R_{i+1}^2 - 2 L_i R_{i+1} \cos(\Theta_{i+1})}$$

$$\Theta_i = Y_i - \arcsin(L_{i+1} \sin(\Theta_{i+1})/R_i)$$

using the notation above for each decreasing integer increment of i, all the way until i=n−1 which indicates the proximal segment with length $L_1$ 421 and its corresponding angles gamma$_1$ 453, $Y_1$, which is the angle from the X-axis to the proximal arm, and theta$_1$ 459, $\Theta_1$, which is the angle from the X-axis to the line $R_1$ 472 between the print head 433 and the origin 451. Once theta, 459, $\Theta_1$, is calculated, the exact (X,Y) coordinate of the print head 433 may be calculated using the length $R_1$ 472 such that (X, Y) is equal to ($R_1 \cos(\text{theta}_1)$, $R_1 \sin(\text{theta}_1)$).

The inverse kinematics may be used to set the various angles of the system when the arm lengths, $L_i$, and desired (X,Y) coordinates are known but the specific angles are not initially known. This indeterminate set of angles may be calculated iteratively by setting all gamma angles, gamma$_i$, $Y_i$, coequal, where gamma$_i$=gamma$_i$+1 for all arm segments (except the proximal angle, gamma$_1$ which is set to gamma$_i$+ arctan (Y/X)). In this approach the arm segments create n sides of a regular polygon and $R_1$ 472 represents the chordal length of a circle in which the polygon is inscribed. The following equation may be used as the start of an iterative numerical calculation to identify the appropriate angle for each arm segments rotation:

$$Y_{initial} = \pi - \frac{2\pi}{n} * \left(1 - \left(\frac{\pi}{4}\right) * R_1 / \sum_{i=1}^{i=n} L_i\right)$$

using the notation above. Subsequently, the calculation approach in the preceding section may be used with an estimated gamma to calculate the resulting $R_1$, then gamma may be adjusted based on whether the calculated $R_1$ is greater or smaller than the desired distance to the printhead calculated as the square root of X, squared, plus the value of Y, squared. With this approach, a many-segment arm may be used to print a 3D structure through the control of the pivot angle between each arm segment.

The present disclosure may be applicable to various mobile machines and machine frames 120, 220, and 320 that may be configured with a 3D printing system 100, 200, and 300. As an example, the machine frame 120, 220 or 320 may be configured to position the printing system 100, 200 and 300 at a location where a structure 135, 235, or 335 may be built. Since the controller 141, 241, and 341 may convert standard 3D printing coordinate data to a positional data of the arm segments 121 and 122, 221, 222 and 223, or 321, 322 and 323 according to the present disclosure, the design of 3D structure 135, 235, or 335 is accomplished. The resultant standard 3D printing coordinate data may be provided via conventional mechanisms and the controller 141, 241, and 341 may convert the same to effect appropriate control over the respective printing system 100, 200 or 300 to construct the desired structure 135, 235, or 335.

The systems and machine 100, 200, and 300 of this disclosure minimize the movement and work effort expended to achieve the positioning of the printhead 133, 233, and 333, respectively, at a point in space by using rotational axes to achieve the same position in space. The Z-axis may be controlled by raising the work platform (e.g., the machine frame 120, 220, or 320) and/or arm segments (121, 122, and 123, or 221 and 222, or 321, 322 and 323) via a support member such as 124 or 224 and/or a mast such as 126 or 226 and/or a lift mechanism such as 325 and/or 329. Since 3D printed structure 135, 235, and 335 may be completed in a layer-by-layer format, the Z-axis need only be obtained once per layer, and a structure 135, 235, or 335 of many levels may be easily achieved.

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitations of ranges of values herein are merely intended to serve as a shorthand method of referring individually to each separate value falling within the range and each separate value is incorporated into the specification as if it were individually recited herein. All methods described herein may be performed in any suitable order unless otherwise indicated herein or otherwise clearly contradicted by context.

Like numbers refer to like elements throughout. In the figures, the thickness of certain lines, layers, components, elements or features may be exaggerated for clarity. Broken lines illustrate axes of rotation or axes of inertia.

The terminology used herein is for the purpose of describing particular embodiments only and is not intended to be limiting of the invention. As used herein, the singular forms "a," "an" and "the" are intended to include plural forms as well, unless the context clearly indicates otherwise. It will be further understood that the terms "comprises" or "comprising," when used in this specification, notes the presence of stated features, operations, elements components and/or groups or combinations thereof, but do not preclude the presence or addition of one or more other features, operations, elements, components and/or groups or combinations thereof.

As used herein, the term "and/or" includes any and all possible combinations or one or more of the associated listed items, as well as the lack of combinations when interpreted in the alternative ("or").

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and claims and should not be interpreted in an idealized or overly formal sense unless expressly so defined herein. Well-known functions or constructions may not be described in detail for brevity and/or clarity.

It will be understood that when an element is referred to as being "on," "attached" to, "connected" to, "coupled" with, "disposed" along, etc., another element, it may be directly on, attached to, connected to, coupled with and/or contacting the other element or intervening elements can also be present. It will also be appreciated by those of skill in the art that references to a structure or feature that is "near" another feature can have portions that overlap or underlie the adjacent feature or it may be spaced some distance apart. It will be understood that the spatially relative terms and depictions are intended to encompass different orientations of the device in use or operation in addition to the orientation depicted in the figures.

It will be understood that, although the terms proximal, distal, etc., may be used herein to describe various elements, these elements should not be limited by these terms. Rather, these terms are only used to distinguish one element or aspect of the invention from another. Thus, a first element discussed herein could be termed a subsequent element without departing from the teachings of the present invention. The sequence of operations (or steps) is not limited to the order presented in the claims or figures unless specifically indicated otherwise.

While the invention has been disclosed in conjunction with a description of certain embodiments, including those that are currently believed to be the preferred embodiments, the detailed description is intended to be illustrative and should not be understood to limit the scope of the present disclosure. As would be understood by one of ordinary skill in the art, embodiments other than those described in detail herein are encompassed by the present invention. Modifications and variations of the described embodiments may be made without departing from the spirit and scope of the invention.

The invention claimed is:

1. A machine comprising:
   a frame;
   a plurality of articulating arm segments consisting of:
      a proximal arm segment, the proximal arm segment coupled to the frame and pivotable at least in a plane substantially parallel with the plane of material deposition;
      one or more additional arm segments, each of said additional arm segments consecutively and pivotally coupled to a previous arm segment in the plurality of articulating arm segments, and pivotable in planes substantially parallel with the plane of material deposition;
   a material line, the material line coupled to at least one arm segment of the one or more additional arm segments, and wherein a material is conveyed therethrough said material line;
   at least one printhead, with said at least one printhead coupled to at least one arm segment in the one or more additional arm segments, and configured in fluid communication with the material line receiving the material and dispensing the material;
   wherein the material comprises a construction material;
   a controller receiving 3D printing information and converting the received 3D printing information into positional coordinates of the at least one printhead, wherein the controller causes movement of the at least one arm segment in the plurality of articulating arm segments to position at least one printhead based on the positional coordinates; and wherein a sensor in fluid communication with the controller measures at least an angle of one or more rotational axes between the frame and the proximal arm segment and between arm segments in said one or more additional segments.

2. The machine of claim 1, further comprising a support member coupled to the frame and coupled to the proximal arm segment, wherein the plurality of articulating arm segments are configured to be lifted away from the frame by engaging the support member to lift the plurality of articulating arm segments in at least in the z-direction, perpendicular to the plane of material deposition.

3. The machine of claim 2, wherein two or more arm segments in the plurality of articulating arm segments are configured to pivot about a rotational axis, which is off-center relative to said arm segments, in at least two dimensions of the frame.

4. The machine of claim 2, wherein the support member is coupled to the frame and rotatably coupled to the plurality of articulating arm segments to allow at least two degrees of movement relative to the support member.

5. The machine of claim 1, further comprising a counter weight coupled to one or more articulating arm segments in said plurality of articulating arm segments.

6. The machine of claim 5, wherein the controller is configured to adjust a position of the counter weight based at least on an extension of one or more articulating arm segments.

7. The machine of claim 1, wherein the frame further comprises a plurality of stabilizers coupled to the frame and moveable from a neutral position in which said plurality of stabilizers are in a retracted position to a lifted position in which said plurality of stabilizers are extended to engage the ground.

8. The machine of claim 7, wherein one or more of the stabilizers is configured to extend radially outward from the frame toward the ground.

9. The machine of claim 7, wherein the frame has a surface parallel to the horizontal plane in both the neutral position and the lifted position.

10. The machine of claim 1, further comprising a position sensor coupled to the printhead and wirelessly communicating the position of the machine to a receiver disposed in a fixed position proximal the frame.

11. The machine of claim 1, wherein the controller is configured to convert the 3D printing information into X and Y positional coordinates of said printhead based on the following algebraic relationships:

$$X = A*\cos(\alpha) + B*\cos(\alpha + \pi - \beta)$$

$$Y = A*\sin(\alpha) + B*\sin(\alpha + \pi - \beta)$$

$$\nu = \alpha + \beta + \pi$$

or the following inverse kinematics relationships:

$$\beta = \arccos((X^2 + Y^2 - A^2 - B^2)/(-2*A*B))$$

$$\alpha = \arcsin(B*\sin(\beta)/\sqrt{X^2 + Y^2}) + \arctan(Y/X);$$

wherein A is a length of the proximal arm segment from a coordinate origin, defined as a rotational axis of the proximal arm segment relative to the machine frame, to a second rotational axis, said second rotational axis connecting the proximal arm segment to an arm segment in said one or more additional arm segments;
wherein B is a length from said second rotational axis to said printhead;
wherein alpha, $\alpha$, is an angle between a line from said coordinate origin to said second rotational axis and a line defined by the X-axis at said coordinate origin;
wherein beta, $\beta$, is an angle between a line from said coordinate origin to said second rotational axis and a line from said second rotational axis to the printhead;
wherein pi, $\pi$, is 180 degrees expressed in radians;
wherein nu, $\nu$, is an angle of the printhead relative to the frame; and
wherein the XOY plane is the plane of material deposition.

12. The machine of claim 1, wherein a mast is coupled to an arm segment of said plurality of articulating arm segments, and configured to move at least in the z-direction, perpendicular to the plane of material deposition, thereby raising or lowering at least one printhead.

13. The machine of claim 1, further comprising a fastener dispensing implement coupled to one or more articulating arm segments in said plurality of articulating arm segments, and configured to dispose one or more fasteners or a contiguous fastening material on top of or at least partially through said material.

14. The machine of claim 1, wherein the frame comprises a plurality of ground engaging elements to facilitate movement of the frame, wherein the plurality of ground engaging elements includes one or more of a wheel and/or one or more of a track.

* * * * *